April 13, 1937.   F. H. MURPHY   2,077,252
DRAFTING BOARD
Filed March 4, 1935
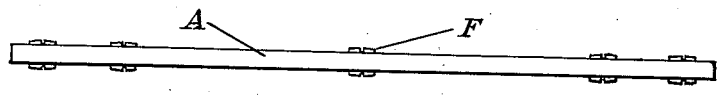
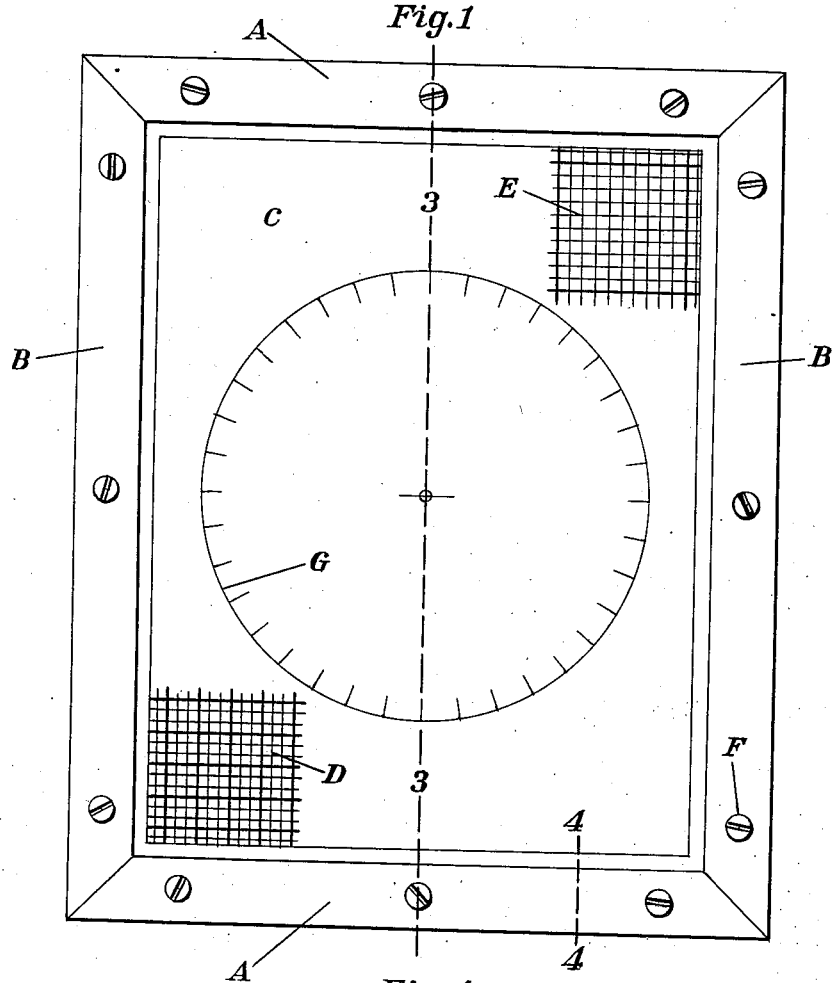
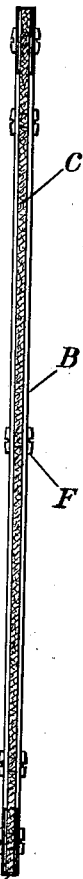
INVENTOR.
Frank H. Murphy Patented Apr. 13, 1937

2,077,252

UNITED STATES PATENT OFFICE 2,077,252

DRAFTING BOARD

Frank H. Murphy, Kansas City, Mo.

Application March 4, 1935, Serial No. 9,254

1 Claim. (Cl. 45—131)

The present invention relates to drafting boards, and aims to provide an improved type of construction whereby the use of thumb tacks may be eliminated and at the same time the binding or fastening means for the drawing paper or tracing cloth may not only serve a loose-leaf binding function but also provide suitable internal straight-edges adapted to serve as guides for the use of drawing instruments.
A further object of the invention is to provide a construction of this general character which presents operative drawing board surfaces at the opposite sides of the board, and having convenient means for the carrying out of the binding or paper-fastening function with relation to either of those surfaces.

A still further object of my improvements is to provide a drafting board of the character indicated and having either or both of its opposite surfaces available for drawing purposes and also designed to be equipped with graph paper of varying characteristics, as well as other drafting guides for facilitating the work of the draftsman in conveniently and efficiently performing the operations incident to the preparation of architectural and engineering plans.

With the foregoing general objects in view, the invention will now be described by reference to the accompanying drawing showing a practical form of construction which I have devised for embodying the proposed improvements, after which those features and combinations deemed to be novel and patentable will be particularly set forth and claimed.
In the drawing—

Figure 1 is a plan view of a drafting board constructed in accordance with my invention,— said view showing fragments of graph paper which may be applied to either or both of the opposite faces of the board;

Figure 2 is an end view of the board;

Figure 3 is a longitudinal sectional view, representing a section taken on the line 3—3 of Figure 1; and Figure 4 is a detail section (on a larger scale) representing a section taken on the line 4—4 of Figure 1, but showing the binder channel member only and in its normally expanding condition before being contracted by the action of the binder screws.

Referring now to the said drawing in detail, the improved construction is illustrated as comprising a main board element C, which may be of standard so-called beaver board material, or its equivalent, and of any desired size. Upon the opposite faces of this board C I preferably mount sheets of graph paper,—such as a sheet of graph paper D having a given scale of divisions, upon one of the faces of the board C, and also a sheet of graph paper E with a different scale of divisions upon the opposite face of the board C. It is also contemplated that a form of protractor scale G may be included as a part of the scale diagram appearing upon either or both of the working surfaces of the board C as represented in Figure 1.

Binder margins are provided for both the end and side margins of said board C. These binder devices comprise channel members A constructed of suitable spring material, such as non-tarnishable spring metal, made up in channel form as illustrated in Figure 4, and formed with suitable flange lips A' designed for gripping or binding engagement with the drawing paper or tracing cloth which is to be mounted upon either or both faces of the board C. These channel members A are constructed so that the sides thereof spring normally outward into the outline illustrated in said Figure 4, thereby slightly spreading the flange lip portions A', as required for the purpose of unclamping and releasing the edges of the tracing cloth or drawing paper. A plurality of binding posts or screws F, of common and well-known design, but having both heads of each post or screw slotted as represented in Figures 2 and 3, are provided for each of the channel members A.

By means of this construction it will be apparent that each of the channel members A may be clamped to one of the margins of the board C, by turning down the screws F into clamping relation to said margin, which operation also acts to clamp the edges or lips of the flanges A' into biting or securing engagement with the margins of the tracing cloth or drawing paper, as the sides of said channels A are contracted into parallel relation as shown in Figures 2 and 3.

Moreover, the construction, including the slotting of both ends of the screws F, is such that the same channels serve to afford the paper-binding function for both faces of the board C, since with the board lying flat upon one of its faces, the unscrewing of the exposed ends of the screws F releases the clamping flanges A' on that side of the board for enabling the tracing cloth or drawing paper thus released to be adjusted or replaced as required.

When placing tracing cloth or paper upon the board for drafting purposes, the screws F at either side of the board are loosened for allowing the channels A to spread slightly open (as indicated in Figure 4), after which the edges of the cloth or paper may be slipped beneath the edges or lips of the retaining flanges A', adjusted properly and the screws F then screwed down or tightened for operating said retaining flanges into binding engagement with the margins of the cloth or paper,—as shown in Figure 3.

Thus the channel members A and the screws F not only provide practical and efficient binding means for holding the tracing cloth or paper in flat and smooth relation upon the surface of the board C (without the use of the usual thumb tacks), but the interior margins of said channel members provide straight edges for simplifying the drawing of plans by enabling the draftsman to use these straight edges as guides for the manipulation of triangles or L squares in the drawing of horizontal or verticle lines according to the scales as represented by the graph paper D, or E,—without the use of any T square; besides which, the protractor diagram mounted centrally of the drawing board surface eliminates also the necessity of using any separate protractor instrument for furnishing the draftsman with suitable reference angles from which appropriate lines may be paralleled.

The improved board construction thereby affords practically unlimited flexibility for the work of the draftsman, by thus providing a drawing surface with all the necessary guides as a part of said surface, and hence reduces the necessary instruments for carrying out all the required drafting operations to practically a minimum.

I am aware that various drafting board constructions have been devised for simplifying the operations required in such work in one or more particulars; but I believe it to be new to combine a board of this character with a loose-leaf binding feature supplying the necessary straight or guiding edges, together with the scale and protractor features also combined or represented as a part of the operative surface of the board; and having also the paper-securing or binding feature for the tracing cloth or drafting paper so constructed as to facilitate the use of either or both of the opposite faces of the board for the same purposes or functions.

I therefore regard as my invention the novel features and combination as defined by the following claim.

I claim:

A drafting board construction comprising a board providing working or drafting surfaces on both of the opposite faces thereof, spring clamping channel members embracing the edges and extending over the opposite faces of said board to clamp sheets of tracing cloth or drawing paper in working relation to either of said surfaces and normally tending to assume paper-releasing position, and screw devices operable from either side of the board for actuating said channel members into paper-clamping relation.

FRANK H. MURPHY.